(12) United States Patent
Tanaka

(10) Patent No.: US 10,880,592 B2
(45) Date of Patent: Dec. 29, 2020

(54) DIGITAL CONTENTS RECEIVING APPARATUS

(71) Applicant: Masahide Tanaka, Osaka (JP)

(72) Inventor: Masahide Tanaka, Osaka (JP)

(73) Assignee: NL GIKEN INCORPORATED, Osaka (JP)

( * ) Notice: Subject to any disclaimer, the term of this patent is extended or adjusted under 35 U.S.C. 154(b) by 264 days.

(21) Appl. No.: 15/922,926

(22) Filed: Mar. 16, 2018

(65) Prior Publication Data

US 2018/0205982 A1    Jul. 19, 2018

Related U.S. Application Data

(63) Continuation of application No. 15/633,776, filed on Jun. 27, 2017, now Pat. No. 9,948,968, which is a
(Continued)

(30) Foreign Application Priority Data

Sep. 14, 2008 (JP) .................................. 2008-235797

(51) Int. Cl.
| | |
|---|---|
| *H04N 21/2665* | (2011.01) |
| *H04N 21/426* | (2011.01) |
| *H04N 21/462* | (2011.01) |
| *H04N 21/472* | (2011.01) |
| *H04N 21/858* | (2011.01) |
| *H04N 21/433* | (2011.01) |
| *H04N 21/438* | (2011.01) |

(Continued)

(52) U.S. Cl.
CPC ....... *H04N 21/2665* (2013.01); *H04N 21/426* (2013.01); *H04N 21/4331* (2013.01); *H04N 21/4383* (2013.01); *H04N 21/4432* (2013.01); *H04N 21/462* (2013.01); *H04N 21/4622* (2013.01); *H04N 21/47208* (2013.01); *H04N 21/8586* (2013.01); *H04N 7/16* (2013.01); *H04N 21/4424* (2013.01); *H04N 21/6581* (2013.01)

(58) Field of Classification Search
CPC combination set(s) only.
See application file for complete search history.

(56) References Cited

U.S. PATENT DOCUMENTS

| | | | |
|---|---|---|---|
| 2002/0013945 A1* | 1/2002 | Nashida | H04N 21/6543 725/58 |
| 2007/0174336 A1* | 7/2007 | Day | H04N 21/8545 |

(Continued)

*Primary Examiner* — Alexander Gee

(57) ABSTRACT

A television set is capable of receiving both broadcast program from television station and corresponding digital file of the same contents from a server station through internet. The television set keeps information of time limit for the server station to surely provide the file. The television set automatically downloads the file when the time limit comes close or the time limit information is failed to be kept. The television set keeps URL for the moving image program enjoyed upon turning-off of the television set until the next turning-on for instantly enjoying the moving image content provided at the URL. User who turning-on the television set or changing the channel with any program not in mind to feel interest in the program on display by chance can enjoy the program from the beginning by means of downloading corresponding digital file of the same contents through internet by an automatic link.

13 Claims, 8 Drawing Sheets

Related U.S. Application Data continuation of application No. 14/934,331, filed on Nov. 6, 2015, now Pat. No. 9,762,964, which is a continuation of application No. 14/519,389, filed on Oct. 21, 2014, now Pat. No. 9,210,484, which is a continuation of application No. 14/224,070, filed on Mar. 25, 2014, now Pat. No. 8,893,187, which is a continuation of application No. 12/557,476, filed on Sep. 10, 2009, now Pat. No. 8,726,028.

(51) Int. Cl.
*H04N 21/443* (2011.01)
*H04N 21/658* (2011.01)
*H04N 7/16* (2011.01)
*H04N 21/442* (2011.01)

(56) References Cited

U.S. PATENT DOCUMENTS

2008/0155615 A1* 6/2008 Craner ............... H04N 21/4751
 725/91
2010/0111504 A1* 5/2010 Yu .................... H04N 21/43622
 386/241

* cited by examiner

DIGITAL CONTENTS RECEIVING APPARATUS

CROSS REFERENCE TO RELATED APPLICATION

This application is a Continuation Application of U.S. application Ser. No. 15/633,776 filed Jun. 27, 2017, which is a continuation application of U.S. application Ser. No. 14/934,331 filed Nov. 6, 2015, which is a continuation application of U.S. application Ser. No. 14/519,389 filed Oct. 21, 2014, which is a continuation application of U.S. application Ser. No. 14/224,070 filed Mar. 25, 2014, which is a continuation application of U.S. application Ser. No. 12/557,476 filed Sep. 10, 2009, herein incorporated by reference in its entirety.

BACKGROUND OF THE INVENTION

1. Field of the Invention

This invention relates to a digital contents receiving apparatus.

2. Description of the Related Art

In this field of the art, various digital contents receiving apparatus have been proposed. Typical digital contents are digital moving image contents, which have been provided by television stations through digital airwaves. Such digital moving image contents are typically received by television sets as the digital contents receiving apparatus for users to enjoy them in real time. Or the digital moving image contents provided by television stations are received by recording apparatus as the digital contents receiving apparatus, such as DVD (Digital Versatile Disc) recorders or HDD (Hard Disk Drive) recorders.

Further, the digital moving image contents have provided by server stations through the internet for a personal computer as the digital contents receiver to receive the digital moving image contents. In this case, the data of digital moving image contents have been downloaded in the compressed filed and decompressed when enjoyed. The digital moving image contents have been also enjoyed through internet in real time by means of streaming technology. Though the internet, not only the digital moving image contents, but also other various digital contents, such as digital still image contents and digital text data for various digital contents receiving apparatus to receive them.

Japanese Laid-open Patent Application No. 2006-319955 proposes an example of automatic recording and playback apparatus for digital moving image contents. Japanese Laid-open Patent Application No. 2001-285743 proposes an example of television set capable of connection to the internet.

However, the increase of options may enrich the world of digital contents receiving apparatuses, it puts ordinary and majority of users, who cannot fully appreciate them, into confusion at the same time. Thus, there still exist in this field of art many demands for improvements of the digital contents receiving apparatuses.

SUMMARY OF THE INVENTION

An object of this invention is to propose an improved digital contents receiving apparatus in easiness of use.

Another object of this invention is to propose an improved digital moving image contents receiving apparatus in easiness of use.

To achieve one of the above objects, this invention provides a receiving apparatus capable of receiving digital contents from outside contents source comprising a first unit arranged to designate one of the digital contents in the outside source, a second unit arranged to keep information necessary for the first unit to designating the same digital content again, and a third unit arranged to automatically obtain from the outside source information relating to control of the designated digital content and keep the information in relation to the information kept in the second unit. According to the feature of this invention, the receiving apparatus can tightly cooperate with the outside content source with a mismatch therebetween avoided.

According to a detailed feature of this invention, the information obtained and kept by the third unit above relates to the time limit for the outside source to surely provide the designated content. By means of this feature, the receiving apparatus can rely on the outside source to avoid such a mismatch that the desired digital content has been deleted form the outside source when the receiving apparatus designates the same digital content again According to another detailed feature of this invention, the receiving apparatus further comprises a fourth unit arranged to automatically receive the designated digital content in response to the information kept by the third unit and store the received digital content. By means of this feature, the desired digital content can be automatically secured in case the outside source will delete the same. According to a further detailed feature of this invention above, the fourth unit is arranged to automatically receive the designated digital content in advance to such a situation that the outside source can no more provide the designated digital content.

According to another detailed feature of this invention, the receiving apparatus further comprises a fourth unit arranged to automatically receive the designated digital content if the third unit fails to obtain the information relating to control of the designated digital content. By means of this feature, the desired digital content can be automatically secured on the safe side under the situation of insufficient information.

According to another detailed feature of this invention, the receiving apparatus further comprises a fourth unit arranged to receive the designated digital content in response to a manual operation for demanding the designated digital content. By means of this feature, the desired digital content can be downloaded any time depending on own responsibility of the user.

A typical example of the digital contents relate to digital moving image contents and the outside contents source relates to a provider of the digital moving image contents. In this case the receiving apparatus further comprises a display unit arranged for viewing the digital moving image contents. However, the above features are not only applicable to the moving image contents, but also widely to other digital contents, such as still image contents or text data contents.

To achieve the objects above, this invention also provides a receiving apparatus capable of receiving digital moving image contents from outside providers of the digital moving image contents comprising a manually operable unit arranged to turn on and off the receiving apparatus in response to a manual operation, a first unit arranged to designate one of the digital moving image contents in the outside provider, a second unit arranged to keep information necessary for the first unit to designate the same digital moving image content again, a third unit arranged to have the second unit keep the information when the manually operable unit turns off the receiving apparatus and have the first unit designate the same digital moving image content again when the manually operable unit turns on the receiving apparatus afterward, a fourth unit arranged to receive the designated digital moving image content in response to the designation by the first unit, and a display unit arranged for viewing the digital moving image contents received by the fourth unit. According to the feature of this invention above, a digital moving image content which has been enjoyed when the manually operable unit turns off the receiving apparatus will be automatically designated again when the manually operable unit turns on the receiving apparatus afterward. This is considered advantageous because the digital moving image content which has been actually enjoyed when the receiving apparatus is turned off is assumed to be of the most interest if no other designation is made.

In a typical case of the above feature according to this invention, the first unit is arranged to designate the digital moving image content by means of selecting the provider, whereby the digital moving image content which is provided by the provider at the time of selection is designated.

In another typical case of the above feature according to this invention, the first unit is arranged to designate a digital moving image content provided by the provider by means of streaming technology in accordance with a program schedule table, whereby the digital moving image content is provided form a part which is provided by the provider at the time of designation.

In a still another typical case of the above feature according to this invention, the first unit is arranged to designate a part of digital moving image content, whereby the digital moving image content is provided form the part which designated by the first unit. According to a detailed feature applicable to this case, the third unit is arranged to have the second unit keep the information of a part of digital moving image content when the manually operable unit turns off the receiving apparatus and have the first unit designate a succeeding part of the same digital moving image content when the manually operable unit turns on the receiving apparatus afterward. In a further still another typical case of the above feature according to this invention, the first unit may arranged to designate an optional part of the digital moving image content in response to a manual operation.

To achieve the objects above, this invention also provides a receiving apparatus capable of receiving digital moving image contents from outside providers of the digital moving image contents comprising, a selector unit arranged to manually select one of the digital moving image contents provided in accordance with a program schedule table predetermined by the provider, a receiver unit arranged to receive the selected digital moving image content from a first part which is provided by the provider at the time of selection by the selector unit, a display unit arranged for viewing the digital moving image contents received by the receiver unit, and a controller unit arranged to make it possible for the display unit to display a second part of the same digital moving image content which has been already provided by the provider. The feature of this invention above is advantageous in such a case that a television set turning-on or channel changing operation is done by a user with any specific digital moving image content not in mind to feel interest in the content appearing on television display by chance in response to the turning-on or channel changing operation.

A typical case in which the above feature is advantageous is when the user desire to instantly view the same interested content from an optional position such as the beginning According to a detailed feature of this invention for such a case, the controller unit is arranged to have the receiver unit receive the second part of the same digital moving image content during a slot of the program schedule table for the selected digital moving image content.

In another typical case of the above feature according to this invention, the controller includes memory unit arranged to keep information necessary for the selector to select the same digital content again.

Still another typical case in which the above feature is advantageous is when the user desire to view the same interested content afterward. According to a detailed feature of this invention for such a case, the second part memory unit is arranged to receive and store the entire data of the digital moving image content.

Other features and advantages according to this invention will be readily understood from the detailed description of the preferred embodiment in conjunction with the accompanying drawings.

The detailed description of the preferred embodiment according to this invention includes various detailed features derived from the above mentioned features. However, such detailed features are not only applicable to the above mentioned features, but also are widely and independently applicable to other objects and features. So, the above description should not be deemed to limit the scope of this invention, which should be properly determined on the basis of the attached claims.

DETAILED DESCRIPTION OF THE PREFERRED EMBODIMENT

Figure 1:
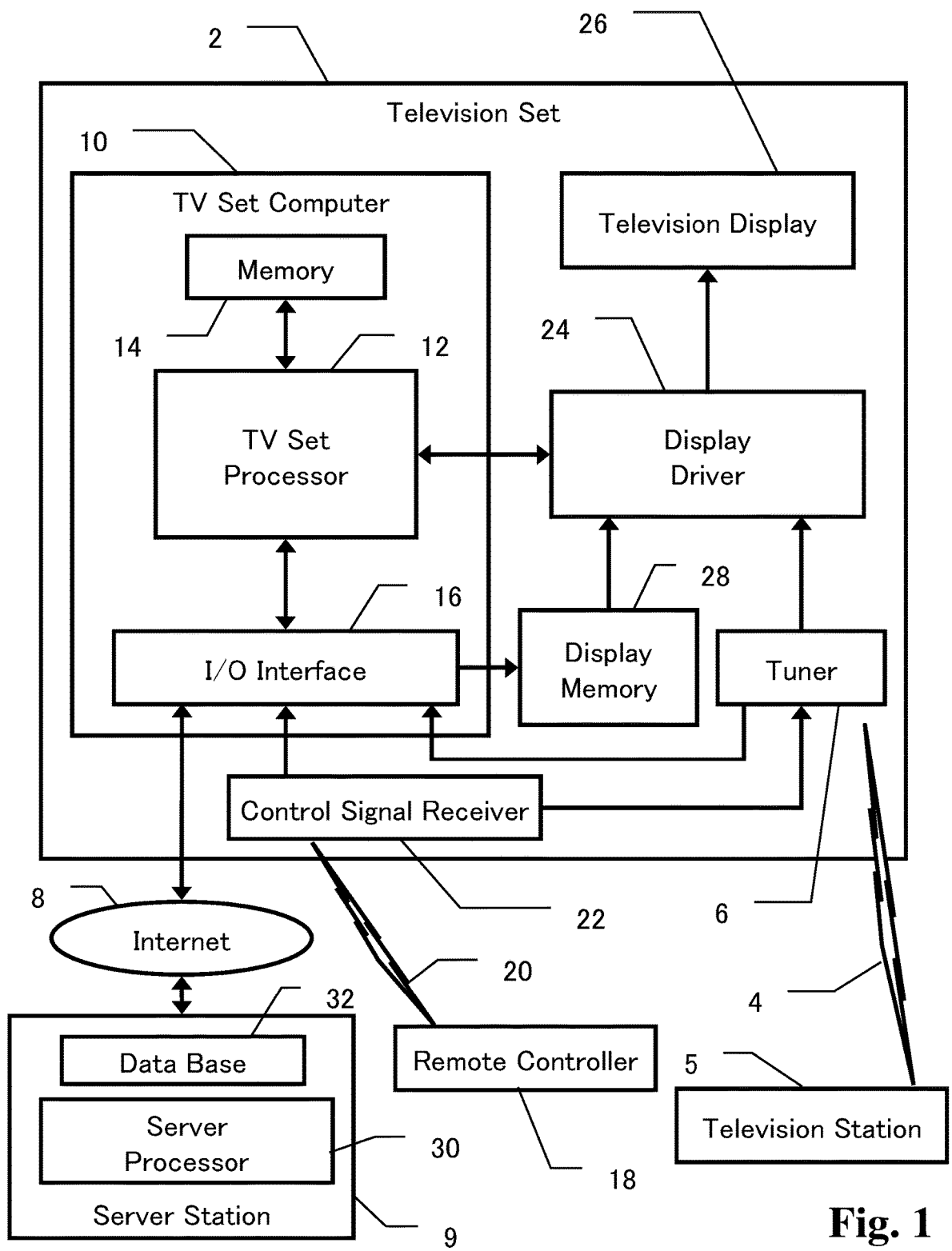
FIG. 1 is a block diagram showing the moving image enjoying system in whole according to a preferred embodiment of this invention.

FIG. 1 is a block diagram showing the moving image viewing system in whole according to an embodiment of this invention. The embodiment includes television set 2 as a receiver of digital contents such as moving images, and television station 5 and server station 9 as providers of the digital contents. Television set 2 in the system includes tuner 6 for receiving a digital broadcast television program content transmitted on digital airwave 4 from television station 5. Television set 2 also includes television set computer 10 for receiving a digital moving image program content provided by server station 9 through internet 8. Television set computer 10 includes television set processor 12, memory 14 and input/output interface 16. Input/output interface 16 serves as a receiver for inputting data of digital moving image program contents stored in data base 32 of server station 9 downloaded by way of internet 8. Memory 14 is for storing computer programs executed by television set processor 12 and also for storing various data such as the digital moving image program contents downloaded from server station 9 by means of input/output interface 16. Memory 14 is of such a large capacity including a hard disk as capable of storing a considerable number of digital moving image program contents.

Input/output interface 16 is further capable of input a control signal transmitted on infra red ray 20 from remote controller 18 and received by control signal receiver 22, which is reported to television set processor 12 for necessary function. Remote controller 18 is to be manually operated for the purpose of turning on/off the main power of television set 2, selecting channels of television stations, and adjusting the audio volume of television set 2. Remote controller 18 further serves as a graphical user interface (GUI) in conjugation with television display 26, in such a manner that remote controller 18 operates various visual buttons displayed on television display 26 or selects among operations in a menu displayed on television display 26. Some signal from remote controller 18 received by control signal receiver 22 is also capable of being directly transmitted to tuner 6 on necessity. Tuner 6, which receives a digital broadcast television program content transmitted on digital airwave 4 from television station 5 as has been mentioned above, will replace television station 5 with another television station in response to a channel selection signal of remote controller 18 directly transmitted by way of control signal receiver 22.

Display driver 24 responsive to data signal from tuner 6 drives television display 26 to display a digital broadcast television program content on television display 26. Display driver 24 further responsive to data signal from display memory 28 drives television display 26 to display a computer display signal transmitted by way of input/output interface 16 under control by television set processor 12. The computer display signal is displayed on television display 26 in such a manner that the display signal is superimposed on a part of digital broadcast television program content as a GUI display in cooperation with remote controller 18. The computer display signal may be alternatively displayed on television display 26 in such a manner that the display signal replaces the entire digital broadcast television program content as an operation menu or a broadcast program schedule table, which is to be selected by an operation at remote controller 18. A digital broadcast television program content received by tuner 6 can also be transmitted to input/output interface 16, and in turn stored in memory 14 in response to remote controller 18 as in the similar manner to the case of the ordinary video tape recorder.

On the other hand, a digital moving image program content provided by server station 9 through internet 8 and stored in memory 14 is converted into moving image data under the control of television set processor 12 to be transmitted to display memory 28 by way of input/output interface 16, and in turn to display driver 24. If display driver 24 under the control of television set processor 12 selects moving image data from display memory 28 in place of that from tuner 6, a digital moving image program content provided by server station 9 though internet 8 is displayed on television display 26 in place of the digital broadcast television program content from television station 5. In this case, an on-demand or live digital moving image program content can be directly provided by server station 9 and displayed on television display 26 in almost real time by means of the streaming technology. Another example of the real time digital moving image program contents provided by server station 9 though internet 8 on the streaming technology is a digital moving image program provided in accordance with a program schedule table voluntarily determined by server station 9 in a similar manner to the case of television station 5.

As in the above, television set 2 according to the embodiment of this invention in FIG. 1 can enjoy both the digital broadcast television program contents from television station 5 on digital airwave 4 and digital moving image program contents provided by server station 9 though internet 8. Further, television set 2 according to the embodiment of this invention in FIG. 1 can not only select between a digital moving image content on air and a digital moving image content downloaded though internet 8, but also can combine both in advantageous manners, which will be explained in accordance with the following flow charts. For the combination in the advantageous manner, server processor 30 in server station 9 participates, the detailed explanation of which will also follow.

As has been mentioned, the digital moving image contents enjoyable on television display 26 are not only the digital moving image program contents on air by television station 5 or the digital moving image contents downloaded from server station 9 though internet 8 and stored in memory 14, but also a real time digital moving image contents provided by server station 9 on the streaming technology. In the case of a real time digital moving image content downloaded from server station 9 through streaming technology, Uniform Resource Locator (URL) for accessing such real time digital moving image content is considered as a channel of a broadcast station provided that server station 9 is prepared to regularly provide the real time digital moving image program contents in accordance with a program schedule table similar to that by television station 5.

Figure 2:
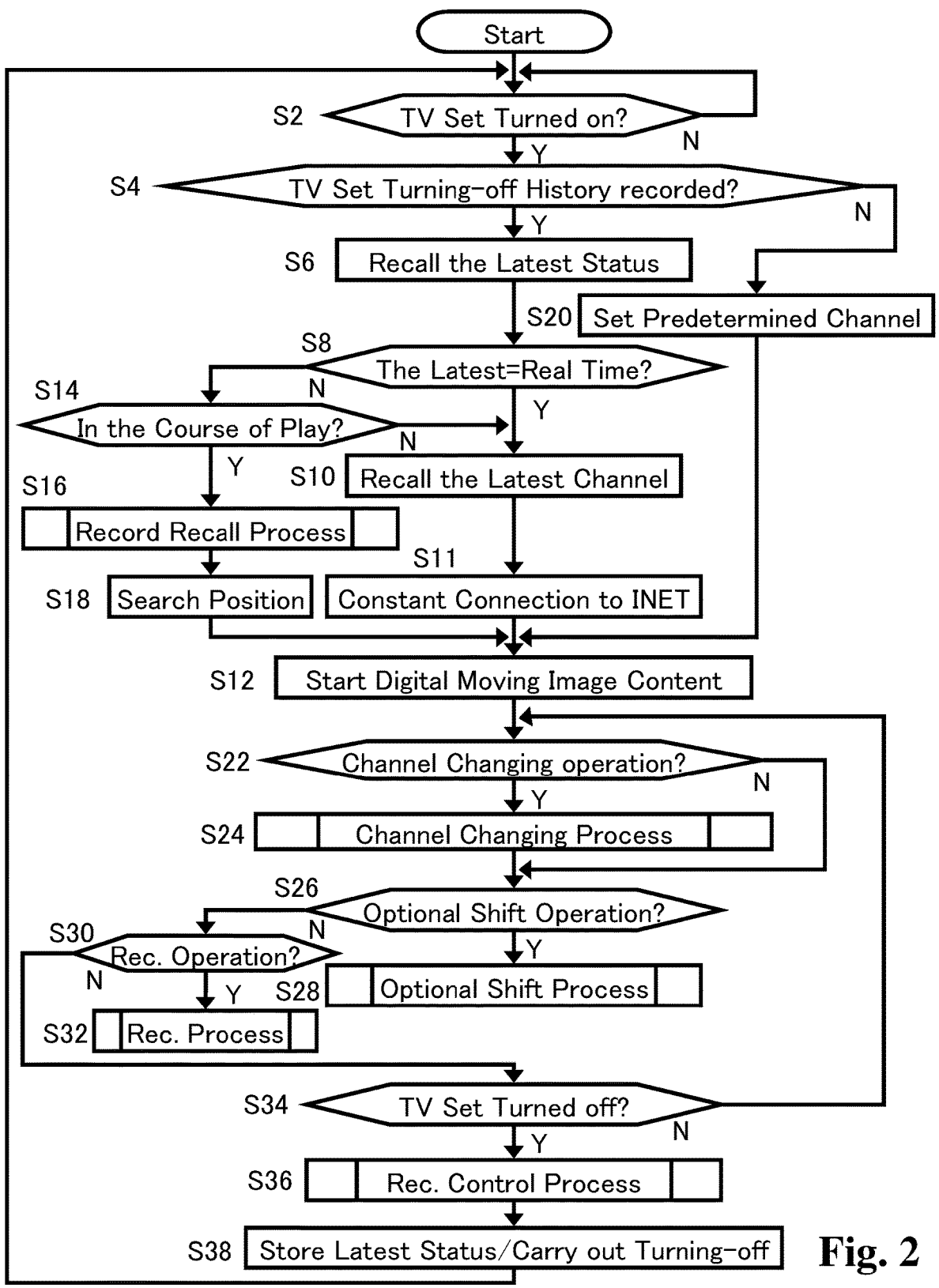
FIG. 2 is a basic flowchart showing the function carried out by television set processor of television set computer in FIG. 1.

FIG. 2 is a basic flowchart showing the function carried out by television set processor 12 of television set computer 10 in FIG. 1. The flowchart starts when television set 2 is connected to the power receptacle, and it is checked in step S2 whether or not television set 2 is turned on. If not, step S2 is repeated to wait the power turn on operation. The "turn on operation" to be checked in step S2 broadly means an operation to turn on the main switch or the like by a user willing to turn on television set 2. For allowing such operation, a power switch is normally turned on in advance for making television set 2 in a standby state capable of detecting turn on operation at remote controller 18. Accordingly, "turn on operation" should not be strictly construed to the turning on of the power switch for truly turning on the television set 2, but is construed to include the turn on operation at remote controller 18 or the like with the power switch having been turned on in advance for the standby state.

If it is determined that television set 2 is turned on, the flow advances to step S4 to check whether or not such a history is recorded in memory 14 that television set was turned off after television set 2 had been connected to the power receptacle. If such the record is detected in step S4, the flow goes to step S6 to recall the status of television set 2 right before the latest turning-off.

Next in step S8, it is checked whether or not the status of television set 2 right before the latest turning-off operation was to select a real time digital moving image content such as broadcast program. In such the case, the flow goes to step S10 to recall the channel selected when television set 2 was turned off at the previous time. This is because that the latest channel is presumed to be of the most interested one. As has been mentioned, in the case of a real time digital moving image content downloaded at input/output interface from server station 9 through internet 8 on streaming technology, Uniform Resource Locator (URL) for accessing such real time digital moving image content is considered as the latest channel. For the purpose of enabling the above case of streaming, television set computer 10 comes into constant connection status to internet 8 in step S11.

The flow then goes to step S12 for instructing display driver 24 to start displaying the digital moving image content. In the case of step S12 following step S10, the digital moving image content currently on air through a channel equal to the latest one is displayed. Though control lines are omitted in FIG. 1 for the sake of simplification, tuner 6 and input/output interface 16 are controlled by television set processor 12, respectively, for the purpose of providing display driver 24 with the necessary digital moving image contents data.

On the other hand, if it is not detected that the status of television set 2 right before the latest turning-off operation was to select a real time digital moving image content, the flow goes to step S14 to check whether or not television set 2 was tuned off in the course of playing a digital moving image content recorded in memory 14. In such a case, the flow goes to step S16 to carry out record recall process in which the digital moving image content interrupted by the latest turning off operation of television set 2 is retrieved. Further in step S18, the position where the digital moving image content is interrupted is searched for restarting the content from the interrupted position. Step S18 is also followed by step S12 for instructing display driver 24 to start displaying the digital moving image content. In the case of step S12 following step S18, the play of digital moving image content, which has been interrupted in the course of the play, is restarted from the interrupted position. This function is carried out automatically in response to the detection of turning-on of television set 2 at step S2. Thus, the user, who has put a halt to the play of the digital moving image content by turning off television set 2, can enjoy the rest of the same digital moving image content by means of simply turning on television set 2.

If it is not detected in step S14 that television set 2 was tuned off in the course of playing a digital moving image content recorded in memory 14, it means that the digital moving image content was completely enjoyed to its end and television set 2 was then turned off. In other words, there is no digital moving image content with any unfinished part to be recalled and viewed when television set 2 is turned on. So, the flow goes to step S10 to recall the latest channel which was selected by television set 2 before selecting the digital moving image content recorded in memory 14. By the way, if it is not detected in step S4 that any history is recorded in memory 14 that television set was turned off after television set 2 had been connected to the power receptacle, the flow goes to step S20 to automatically select a predetermined channel to go to step s12. In the absence of step S20, the flow would reach step S12 without selection of channel for television set 2 to start display in response to the turning on thereof. The channel predetermined for step S20 may have been manually or automatically selected depending on the user, or may be generally set as the default channel.

After the start of displaying the digital moving image content in step S12, the flow goes to step S22 with the display continued. In step S22, it is checked whether or not an operation is done to change the channel selection. If such an operation is detected, the flow goes to step S24, in which channel selection changing process is carried out, followed by step S26. The channel selection changing process includes a change from a channel for broadcast program to the play of digital moving image content stored in memory 14. The detail of channel selection changing process in step S24 will be explained later. On the other hand, if it is not detected that any operation is done to change the channel selection, the flow directly goes to step S26

Step S26 is to check whether or not such an operation is done that the position of the digital moving image content to start with is optionally shifted from the position currently displayed. The position to be optionally shifted includes the beginning of the content. If such the operation is detected in step S26, the flow goes to step S28 to carry out optional shift process to realize the desired shift of position. The optional shift operation is mainly done under the condition that a real time digital moving image content on air from television station 5 or downloaded from server station 9 on streaming is displayed on television display 26 in response to the turning-on or channel change of television set 2. In other word, the optional shift operation is expected to be done when a television set turning-on or channel changing operation is done by a user with any specific digital moving image content not in mind to feel interest in the content appearing on television display 26 by chance in response to the turning-on or channel changing operation. And, such the user may desire to instantly view the interested content from an optional position such as the beginning. The detail of optional shift process will be explained later.

On the other hand, if the optional shift operation is not detected in step S26, the flow goes to step S30 to check whether or not a recording operation is done. And, if the recording operation is detected, the flow goes to step S32 to carry out recording process. It should be noted here that the recording process 32 is to record the digital moving image content form the beginning to the end of that in contrast to the conventional recording in which the recording is done form the position of the content where the recording operation is done. The detail of the recording operation will be explained later. Also the recording operation is mainly done under the condition that a real time digital moving image content on air from television station 5 or downloaded from server station 9 on streaming is displayed on television display 26 in response to the turning-on or channel change of television set 2. In other word, the recording operation is expected to be done when a television set turning-on or channel changing operation is done by a user with any specific digital moving image content not in mind to feel interest in the content appearing on television display 26 by chance in response to the turning-on or channel changing operation. And, such the user may desire to record the interested contents for the purpose of viewing it later from the beginning.

On the other hand, if the recording operation is not detected in step S30, the flow goes to step S34 to check whether or not an operation is done to turning-off television set 2. And, if the television set turning-off operation is detected in step S34, the flow goes to step S36 to carryout recording control process, the details of which will be explained later. Further, in step S38, the status of television set 2 right before the turning-off is stored ins memory 14 and the turning-off of television set 2 is carried out. The flow then goes back to step S2. Due to the function in step S38 to store the status of television set 2, various checks and functions to be carried out in steps S4 to S10 and steps S14 to S18 are made possible.

On the other hand, if the television set turning-off operation is not detected in step S34, the flow goes back to step S22 to repeat the loop of steps S22 to 26, S30 and 34 unless one of the optional shift operation, the recording operation and the television set turning-off operation is detected in one of steps S26, S30 and S34, respectively. And, during the repetition of the loop, the display on television display 26 is continued and prepared to respond to any of the channel changing operation, the optional shift operation and the recording operation.

In the case of returning from step S38 to step S2, the flow goes into the stage of waiting a next turning-on operation by repeating step 2, and the flow advances to the steps led by step S4 if the next turning-on operation is detected in step S2. It should be noted that optional shift process in step 28 and recording process in step S32 are both include a step to return to step 2, which will be explained later in detail.

Figure 3:
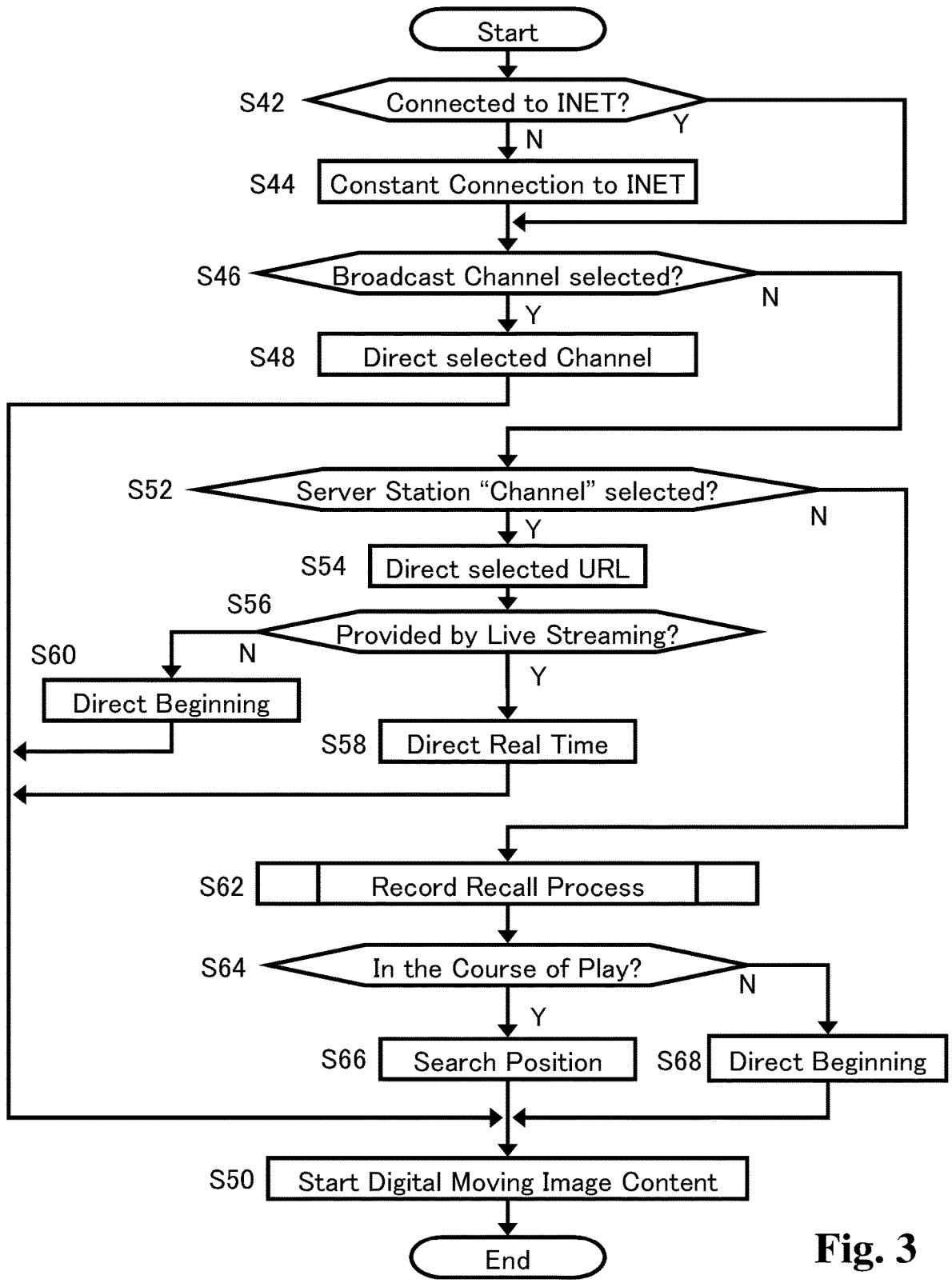
FIG. 3 is a flowchart showing the detailed function of the channel changing process in step S24 in FIG. 2.

FIG. 3 is a flowchart showing the detailed function of the channel changing process in step S24 in FIG. 2. If the flowchart starts, it is checked in step S42 whether or not television set computer 10 has been connected to internet 8. If not, the flow goes to step S44 to instruct the constant connection to internet 8, and advances to step S46. By this, the preparation for internet communication during the channel changing process is secured. On the other hand, if it is checked in step S42 that television set computer 10 has been connected to internet 8, the flow directly goes to step S46.

In step S46, it is checked whether or not a conventional channel for broadcast program has been selected in step S22 in FIG. 2. If it is the case, the flow goes to step S48 to direct the selected channel and advances to step S50. In step 50, it is directed to start displaying the digital moving image content, the flow then going to the end. In this case, a new channel of digital moving image content starts to be displayed, which is seemingly identical with the channel changing in the conventional television set.

On the other hand, if it is not detected in step S46 that a conventional channel for broadcast program has been selected in step S22 of FIG. 2, the flow goes to step S52, in which it is checked whether or not a "channel" of server station 9 has been selected in step S22 of FIG. 2. If it is the case, the flow goes to step S54 to direct URL relating to the server station 9. The directed URL is for directly designating data of the digital moving image content prepared by server station 9 in accordance with a program schedule table. Next in step S56, it is checked whether or not the digital moving image content for the URL is provided by live streaming. If it is the case, the flow goes to step SS58 to direct real time display and the flow goes to step S50 in which the digital moving image content starts to be displayed from a position currently provided in real time by means of the live streaming. The flow then goes to the end. Also in this case, the display in response to the channel changing operation in step S22 in FIG. 2 is seemingly identical with the channel changing to a live remote broadcast program in the conventional television set.

If it is determined in step S56 that URL directed in step S54 is not the digital moving image content provided by live streaming, the flow goes to step S60. In step S60, the beginning of the digital moving image content for the URL is directed as the point to start with. Next, the flow is advanced to step S50 for carrying out the starting of the content with its beginning, the flow then going to the end. In this case, the digital moving image content is started in step S50 with the beginning every time in response to a new selection of "channel", which is similar to the case of playing back a recorded digital moving image content. On the other hand, the series of function carried out by steps S54, S56, S60 and S50 is similar to the case of normal broadcast digital moving image content provided by television station 5 in accordance with a program schedule table in that a user cannot independently select a digital moving image content itself but can merely select a "channel" in which server station 9 exclusively determine or substitute a digital moving image content for the URL regarded as a "channel".

If it is not determined in step S52 that a "channel" of server station 9 has been selected, it means that the channel selection in step S22 of FIG. 2 is for retrieving a digital moving image content recorded in memory 14. In this case, accordingly, the flow goes from step S52 to step S62 in which record recall process is carried out, the details of step S62 being to be explained later. Next, in step S64 it is checked whether or not the retrieved digital moving image content is in such a condition that the content was interrupted in the course of playing thereof. In such a case, the flow goes to step S66 to search the position where the digital moving image content is interrupted for restarting the content from the interrupted position in step S50. This function is carried out automatically in response to the detection of a new selection of "channel". Thus, the user, who has put a halt to the play of the digital moving image content by selecting another "channel", can enjoy the rest of the same digital moving image content by means of simply select the same "channel".

On the other hand, if is not determined that the retrieved digital moving image content is in such a condition that the content was interrupted in the course of playing thereof, the flow goes to step S68 to direct the beginning of the retrieved digital moving image content as the point to start with in step S50. In this case, the user can enjoy the digital moving image content from the beginning by means of simply select a "channel". This is similar to the case of the function carried our in accordance with the flow from step S60 to step S50.

Figure 4:
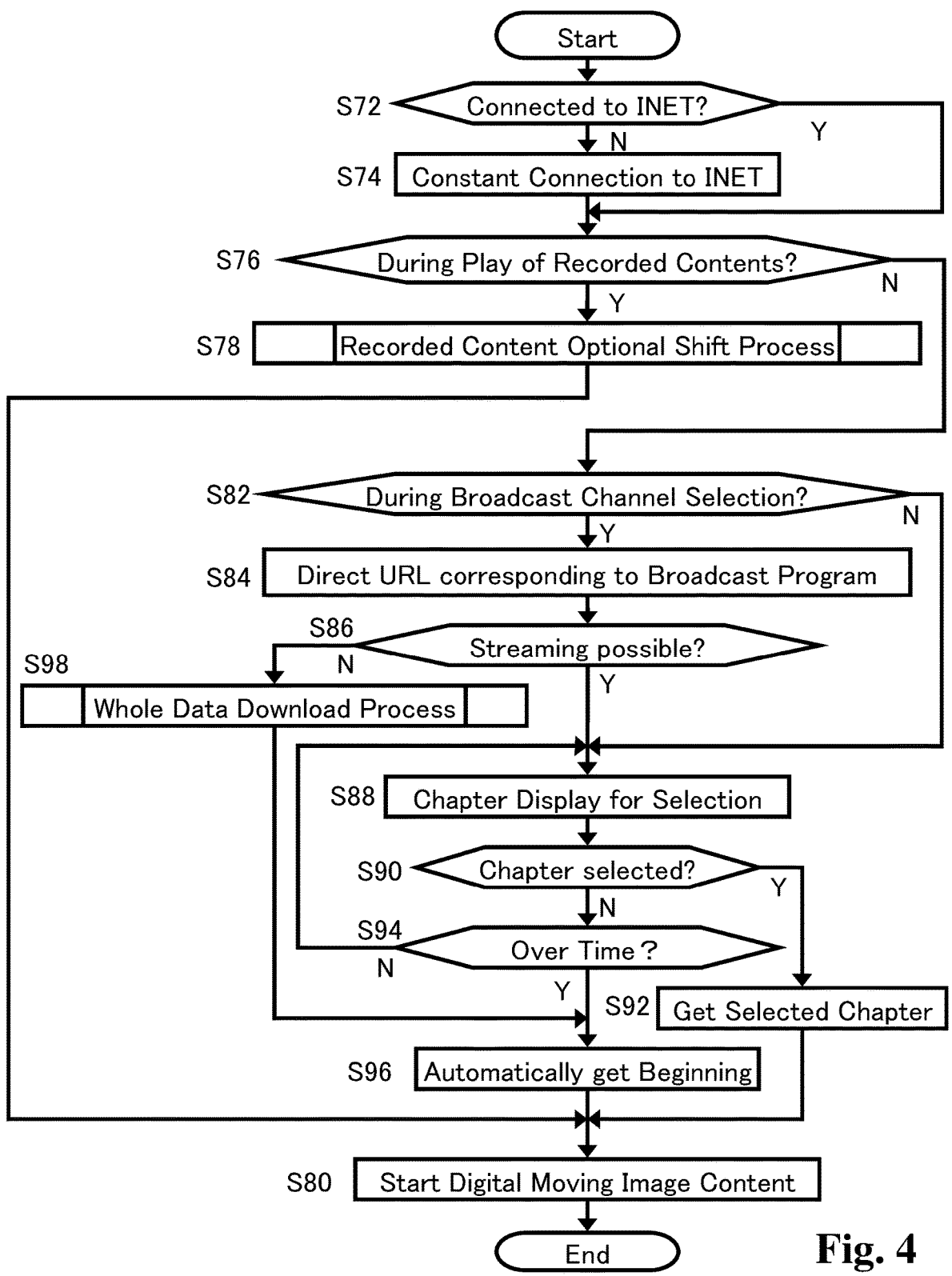
FIG. 4 is a flowchart showing the detailed function of the optional shift process in step S28 in FIG. 2.

FIG. 4 is a flowchart showing the detailed function of the optional shift process in step S28 in FIG. 2. If the flowchart starts, it is checked in step S72 whether or not television set computer 10 has been connected to internet 8. If not, the flow goes to step S74 to instruct the constant connection to internet 8, and advances to step S76. By this, the preparation for internet communication during the c optional shift process is secured. On the other hand, if it is checked in step S72 that television set computer 10 has been connected to internet 8, the flow directly goes to step S76.

In step S76, it is checked whether or not the optional shift operation detected in Step S26 is done during the play of the digital moving image content recorded in memory 14. If it is the case, the flow advances to step S78, in which recorded content optional shift process is carried out. The recorded content optional shift process in step S78 is similar to well known functions for conventional picture recorder, such as the first-forward function, or the skipping function or the selection among chapters of a chaptered digital moving image content. When a position of the recorded moving image content has been determined through step S78, the flow goes to step S80 to issue a direction to start displaying the digital moving image content with the determined position, the flow then going to the end. As has been mentioned above, this function is similar to that in conventional video recorders or DVD recorders.

On the other hand, if it is not determined in step S76 that the optional shift operation detected in Step S26 is done during the play of the digital moving image content recorded in memory 14, the flow goes to step S82. In step S82, it is checked whether or not the optional shift operation detected in Step S26 is done during broadcast channel selection of television station 5. If it is the case, the flow advances to step S84 to direct URL of server station 9 for digital moving image content corresponding to the broadcast digital moving image program from television station 5. For making the above function possible, both television 5 and server station 9 are providing the same digital moving image contents in cooperation. Further in step S86, it is checked whether or not the digital moving image content designated with URL is capable of being provided by means of streaming to go to step S88 if streaming is possible.

In step S88, the digital moving image content designated by URL is divided into chapters in unit of packet or group of packets and a view format of chapters is displayed on television display 26 for facilitating the optional shift by means of a selection of the chapter with which the digital moving image content is to start. The flow advances to step S90 with the display started in step S88 continued. In step S90, it is checked whether or not a chapter is selected by means of GUI in combination of remote controller 18 and television display 26. If chapter selection is detected in step S90, the flow goes to step S92 to download the packet corresponding to the selected chapter, the digital moving image content being instantly started with the selected chapter by means of streaming in step S80 as soon as the corresponding packet is downloaded. Thus, if a user meets a midstream of some broadcast digital moving image content provided in accordance with a scheduled program by chance of selecting a channel and gets interested in the content, the user can enjoy the content at any desirable position, including the beginning, of the content.

On the other hand, it is not determined in step S90 that a chapter is selected, the flow goes to step s94, in which it is checked whether or not the time since the display started in step S88 has past over a limit. If not, the flow returns to step S88 to repeat steps S88 to S94 with the display started in step S88 continued unless the time has past or chapter selection is detected. The case of detection of chapter selection in step S90 has been above explained.

If it is determined in step S94 that the time since the display started in step S88 has past over a limit, the flow goes to step S96 to download the packet corresponding to the beginning of the digital moving image content, the digital moving image content being instantly started with the beginning by means of streaming in step S80 as soon as the corresponding packet is downloaded. Thus, if a user meets a midstream of some broadcast digital moving image content provided in accordance with a scheduled program by chance of selecting a channel and gets interested in the content, the user can enjoy the content from its beginning by means of simply make the optional shift operation with remote controller 18, which is detected in step S26 of FIG. 2 and the rest of necessary functions are all automatically carried out even if no further operation will be done.

On the other hand, if it is not determined in step S82 that optional shift operation detected in Step S26 is done during broadcast channel selection for television station 5, it means that the optional shift operation detected in Step S26 is done during URL "channel") selection for the real time digital moving image program contents provided by server station 9 though internet 8 on the streaming technology in accordance with a program schedule table voluntarily determined by server station 9 in a similar manner to the case of television station 5. So, the flow directly goes from step S82 to step S88 in this case. In other word, since the URL has already determined as well as the streaming possibility has already confirmed in this case, the flow can directly goes to step S88 with steps S84 and S86 omitted. The function led by step S88 in the case of directly coming from step S82 is identical with the case of broadcast channel selection with no additional explanation needed.

If it is not determined in step S86 that the digital moving image content designated with URL is capable of being provided by means of streaming, the flow goes to step S98 for hole data download process, in which the whole data necessary for playing the entirety of the digital moving image content is downloaded. And, if the download has been completed in step S98, the flow goes to step S96. In step 98 in this case, the beginning of the downloaded whole data is automatically get ready for starting in step S80. In other words, the content gotten by the whole data download is automatically started with the beginning since the content is not divided into chapters in unit of packet or group of packets in terms of streaming which is treated in steps S88 and S90.

Figure 5:
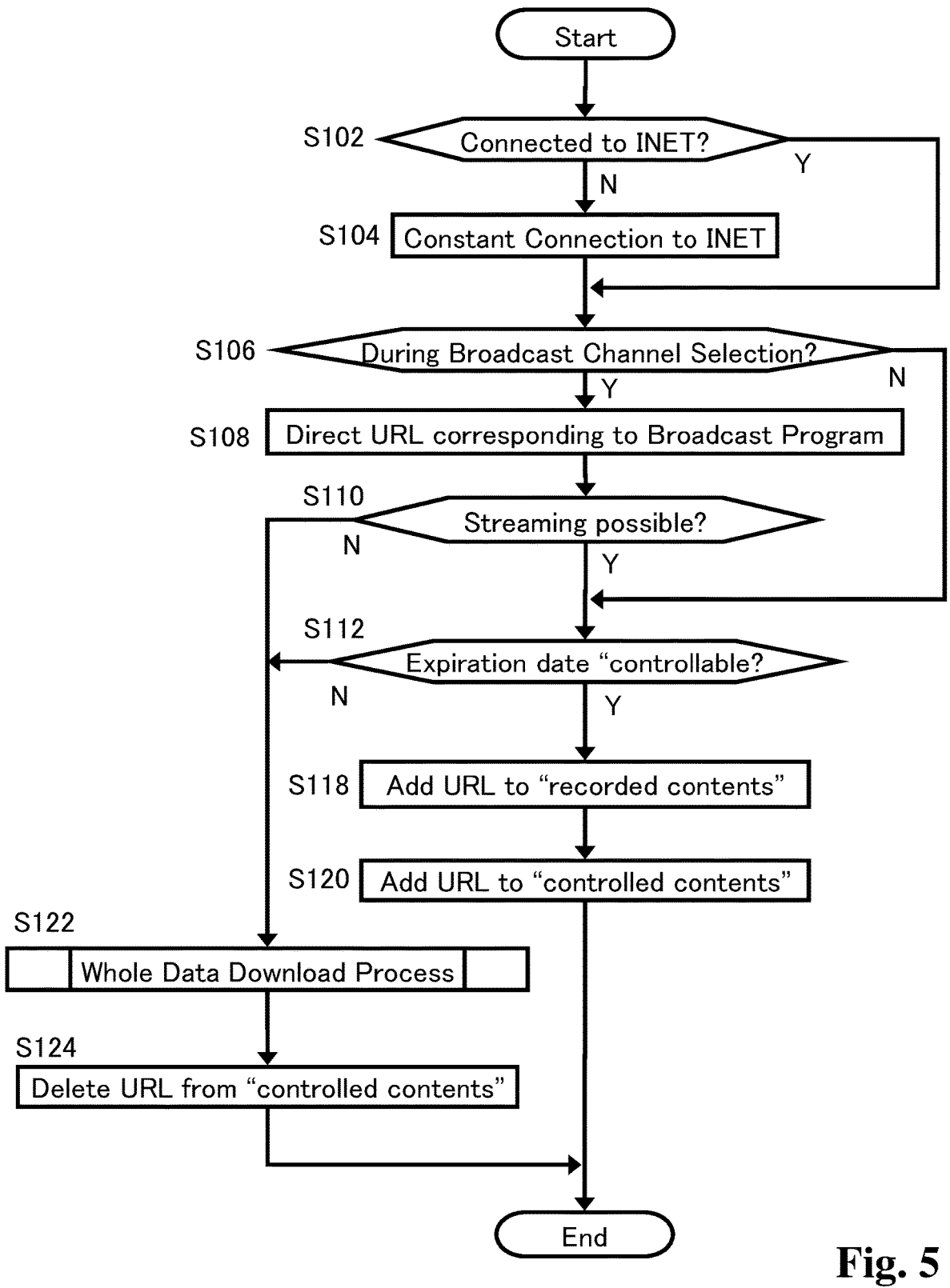
FIG. 5 is a flowchart showing the detailed function of the recording process in step S32 in FIG. 2.

FIG. 5 is a flowchart showing the detailed function of the recording process in step S32 in FIG. 2. If the flowchart starts, it is checked in step S102 whether or not television set computer 10 has been connected to internet 8. If not, the flow goes to step S104 to instruct the constant connection to internet 8, and advances to step S106. By this, the preparation for internet communication during the recording process is secured. On the other hand, if it is checked in step S102 that television set computer 10 has been connected to internet 8, the flow directly goes to step S106.

In step S106, it is checked whether or not the recording operation detected in step S30 in FIG. 2 has been done during conventional channel selection of broadcast program by television station 5. If it is the case, the flow advances to step S108 to direct URL of server station 9 for digital moving image content corresponding to the broadcast digital moving image program from television station 5. For making the above function possible, both television 5 and server station 9 are providing the same digital moving image contents. Further in step S110, it is checked whether or not the digital moving image content designated with URL is capable of being provided by means of streaming to go to step S112 if streaming is possible.

On the other hand, if it is not determined in step S106 that the recording operation detected in Step S30 is done during broadcast channel selection for television station 5, the flow directly goes to step S112. No detection in step S30 of the recording operation during broadcast channel selection means that the recording operation is done during enjoying digital moving image content provided by server station 9 through streaming technology since there is no such a case that the recording operation is done during the play of the digital moving image content recorded in memory 14. Thus, the above flow is designed to directly go from step S106 to step S112 in this case as in the case that the streaming possibility is determined in step S110.

In step S112, an expiration date after which the digital moving image content will be no more provided is confirmed to check whether the expiration date is controllable.

Here "controllable" means that server station 9 guarantees that it continues to provide the content until the expiration date without fail and also a predetermined sufficient time (e.g., one week) is left before the expiration date.

If it is confirmed that the expiration date controllable, the flow goes to step S118 to add URL for the digital moving image content for enjoying the content from the beginning by means of streaming technology, the URL being added to a list of "recorded contents". Further in step S120, the URL is added to a list of "controlled contents", the flow then going to the end. In other words, if the content to be recorded is possible to be provided by streaming in the future and the expiration date is controllable, the date itself of the digital moving image content is not downloaded in response to the recording operation, but URL of the content is recorded for starting the content upon an operation for "play of recorded content" and the control of the expiration date is secured. Process of "recalling" the contents "recorded" in the above manner will be explained later.

On the other hand, if it is not determined in step S110 that the digital moving image content designated with URL is capable of being provided by means of streaming, the flow goes to step S122 for hole data download process, in which the whole data necessary for playing the entirety of the digital moving image content is downloaded. And, if the download has been completed in step S122, the flow goes to step S124 for deleting the URL from "controlled contents", the flow then going to the end. Similarly, if it is not determined in step S112 that the expiration date is controllable, the flow goes to step S122 for hole data download process. And, if the download has been completed in step S122, the flow goes to step S124 for deleting the URL from "controlled contents", the flow then going to the end also in this case.

Figure 6:
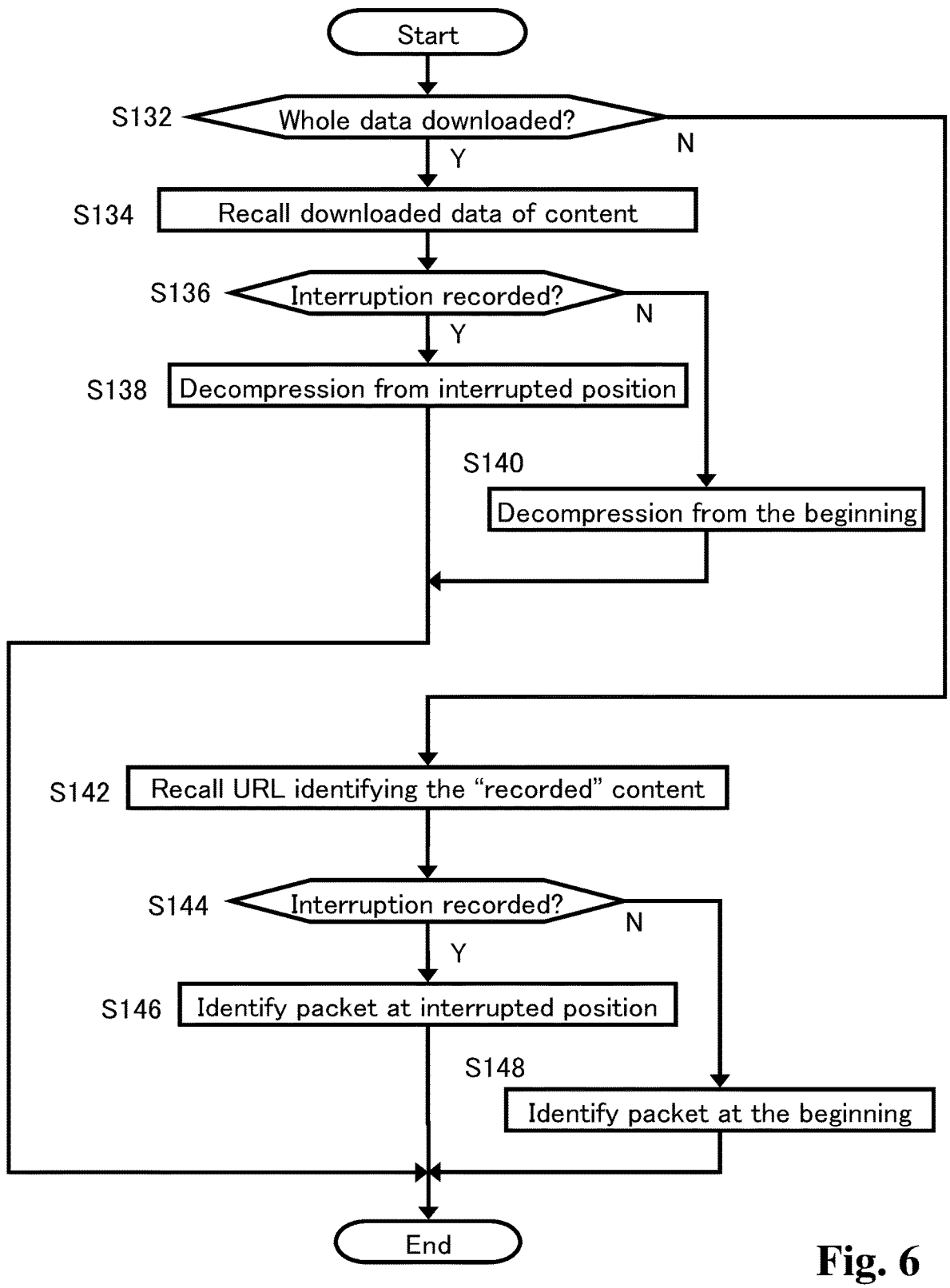
FIG. 6 is a flowchart showing the detailed function of the record recall process in step S16 in FIG. 2 or in step S62 in FIG. 3.

FIG. 6 is a flowchart showing the detailed function of the record recall process in step S16 in FIG. 2 or in step S62 in FIG. 3. If the flowchart starts, it is checked in step S132 whether or not whole the data of the digital moving image content has been downloaded and recorded in memory 14 in compressed form. If whole the data has been downloaded, the flow goes to step S134 to recall the compressed data from memory 14. And it is checked in step S136 whether or not such information is recorded that the digital moving image content has been interrupted at some position during playing the content. If it is determined in step S136 that the information of interruption is recorded, the flow goes to step S138 for preparing to decompress the recalled data of the content for restarting the content at the interrupted position, the flow then going to the end. On the other hand, if it is not determined in step S136 that the information of interruption is recorded, the flow goes to step S140 for preparing to decompress the recalled data of the content for starting the content from the beginning, the flow then going to the end also in this case.

If it is not determined in step S132 that whole the data of the digital moving image content has been downloaded, the flow goes to step S142 to recall URL form the list of "recorded contents". The URL is not only for designating server station 9, but also directly identifying the digital moving image content "recorded". And it is checked in step S144 whether or not such information is recorded that the digital moving image content has been interrupted at some position during streaming of the content. If it is determined in step S144 that the information of interruption is recorded, the flow goes to step S146 for identifying the packet corresponding to the interrupted position to restart the content therefrom, the flow then going to the end. On the other hand, if it is not determined in step S144 that the information of interruption is recorded, the flow goes to step S148 for identifying the packet corresponding to the beginning of the content to restart the content therefrom, the flow then going to the end also in this case.

The functions mentioned in steps S138, S140, S146 and S148 all relate to preparation of data or information necessary in the succeeding processes. In more detail, the data or information above are utilized as an object to be searched or directed in step 18 in FIG. 2 or steps S66 or S68 in FIG. 3 for enjoying the digital moving image contents. Further, URL's for identifying packets treated in steps S146 and S148 are also utilized in steps S58 and S60 in FIG. 3 and steps S92 and S96 in FIG. 4.

Figure 7:
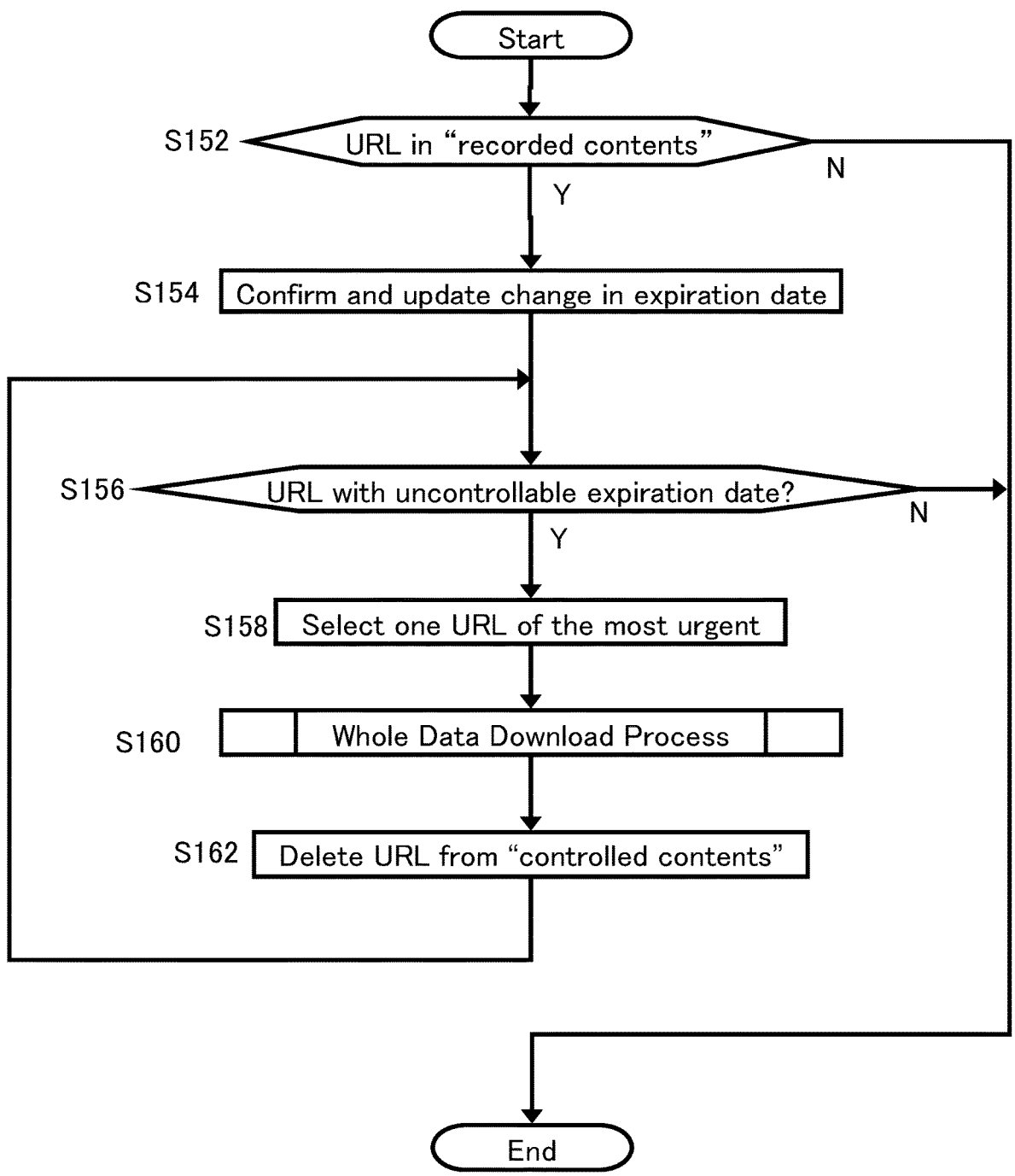
FIG. 7 is a flowchart showing the detailed function of the record control process in step S36 in FIG. 2.

FIG. 7 is a flowchart showing the detailed function of the record control process in step S36 in FIG. 2. The flow in FIG. 2 is for controlling URL's added to the "recorded contents" through step S118 in FIG. 5. If the flow starts, it is checked in step S152 whether or not URL is recorded in the "recorded contents". If any, the flow goes to step S154 to access all the recorded URL's one by one for confirming and updating any change in the expiration date.

Next in step S156, each of the updated expiration dates is compared with today's date and check whether or not any URL with uncontrollable expiration date exists. Here "uncontrollable" means that a predetermined sufficient time (e.g., one week) is no more left before the expiration date. In other words, "uncontrollable" means that whole the data of the content should be urgently download to secure it in memory 14, otherwise there will be a risk of loosing any chance of enjoying the content afterward. If such a URL is detected in step S156, the flow goes to step S158 to select one URL with the most urgent expiration date if a plurality of URL's are detected. And, the whole data of the selected URL is downloaded at hole data download process in step S160. And, if the download has been completed in step S122, the flow goes to step S162 for deleting the URL from "controlled contents", the flow then going back to step S156.

In step S156, it is checked again whether or not any URL with uncontrollable expiration date exists among the remaining URL's. If such a URL is detected in step S156 again, the flow goes to step S158 again. In this manner, the loop of steps S156 to S162 is repeated unless no URL with uncontrollable expiration date is detected in step S156. On the other hand, if no URL with uncontrollable expiration date is detected in step S156, the flow is to instantly go to the end. Further, if it is not detected in step S152 that URL is recorded in the "recorded contents", the flow is to instantly go to the end.

Figure 8:
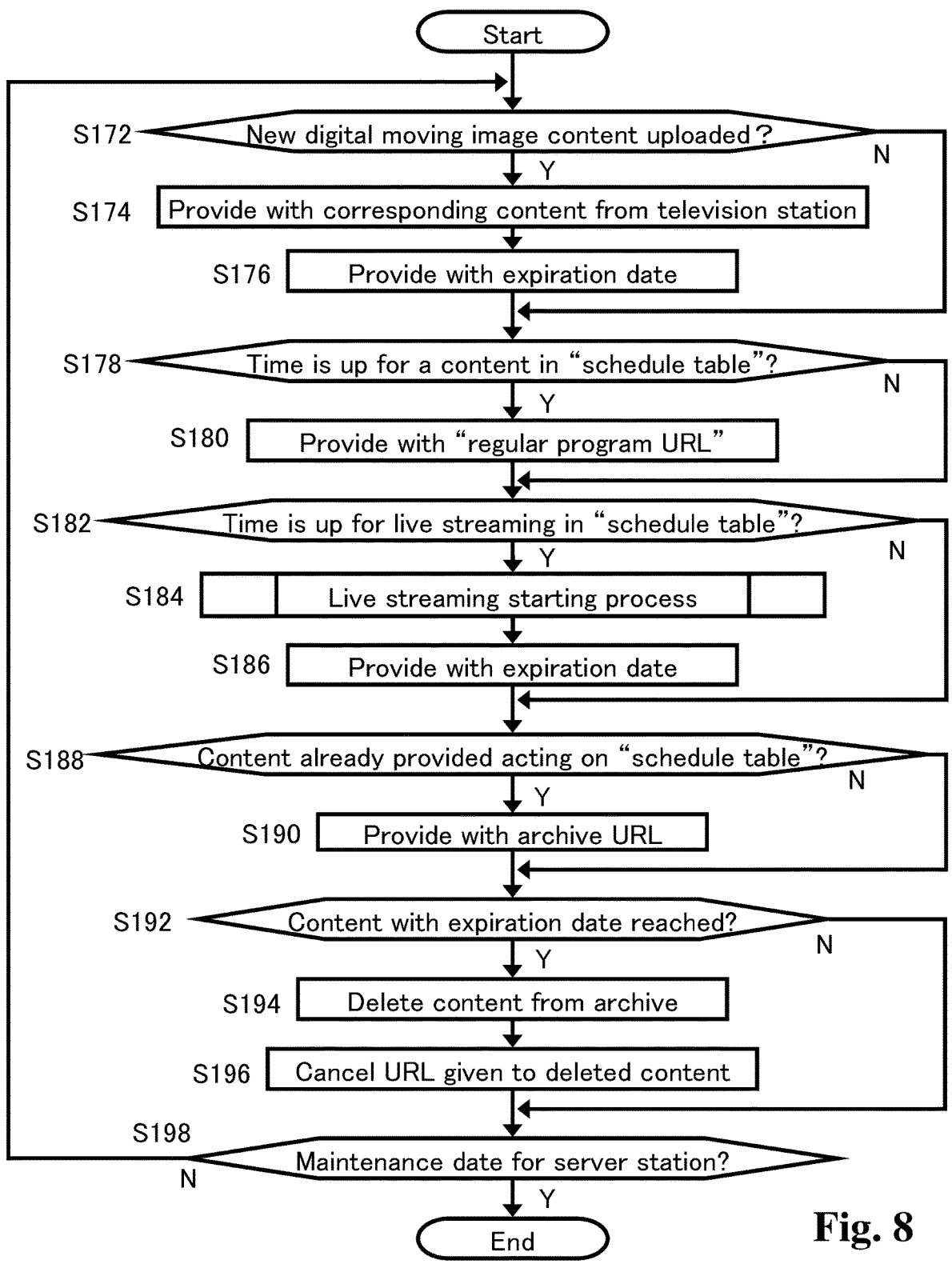
FIG. 8 is a flowchart showing a partial function carried out by server processor of server station in cooperation with television set processor of television set computer in FIG. 1.

FIG. 8 is a flowchart showing a partial function carried out by server processor 30 of server station 9 in cooperation with television set processor 12 of television set computer 10 in FIG. 1. The partial function relates to the cooperation with television server 5 and the control of expiration date for each of the digital moving image contents. Server processor 30 includes not only a central processing unit (CPU) in the narrow sense, but also various peripheral units such as communication unit which are necessary for the server though the details such units are omitted in FIG. 1. The flowchart in FIG. 8 starts in response to the initial rise of server processor 30 so that it is checked in step S172 whether or not new digital moving image content is uploaded for providing it through internet 8. The "new digital moving image content" is of just the same content as that of the digital moving image content provided by television station 5 through digital airwave 4.

If it is confirmed in step S172 that the new digital moving image content is uploaded, the flow goes to step S174 to provide the uploaded digital moving image content with information indicative of the tight relationship with the same digital moving image content provided by television station 5. Further in step S176, the uploaded digital moving image content is provided with information indicative of its expiration date, the flow then going to step S178. On the other hand, if it is not confirmed in step S172 that the new digital moving image content is uploaded, the flow directly goes to step S178.

In step S178, it is checked whether or not time is up for one of digital moving image contents which is to be provided on time through streaming technology in accordance with a predetermined "broadcast program schedule table". If any, the flow goes to step S180 to provide the content with "regular program URL" indicative of a slot in the "broadcast program schedule table", the flow then going to step S182. On the other hand, if it is not confirmed in step S178 that time is up for any of the scheduled digital moving image content, the flow directly goes to step S182. Thus, if the "regular program URL", which is broadly considered as a channel of a broadcast station, is selected by television set 2 during the slot for the program, the digital moving image content is automatically provided through streaming technology by server station 9 from a packet corresponding to the time when the "regular program URL" is selected. In other words, the digital moving image content is provided through streaming technology by server station 9 in the very similar manner to that in the conventional television program provided by television station 5. In more detail, if the "regular program URL" is selected on time of "broadcast program schedule table", the digital moving image content will be enjoyed from its beginning In contrast to that, if the "regular program URL" is selected in midstream of the slot of "broadcast program schedule table", the digital moving image content will be enjoyed from the midstream of the content corresponding to the time.

In step S182, it is checked whether or not time is up for a live digital moving image content which is to be provided on time through streaming technology in accordance with a predetermined "broadcast program schedule table". If any, the flow goes to step S184 to carry out live streaming starting process, in which live image is captured as streaming data and the provision of the captured image through streaming technology is started. Further in step S186, the captured live digital moving image content is provided with information indicative of its expiration date, the flow then going to step S188. On the other hand, if it is not confirmed in step S182 that time is up for any live digital moving image content, the flow directly goes to step S188. Thus, if the URL for live streaming, which is also broadly considered as a channel of a broadcast station, is selected by television set 2 during the slot in the "broadcast program schedule table", the digital moving image content is automatically provided through streaming technology by server station 9 from a packet corresponding to the time when the URL for live streaming is selected.

In other words, the live digital moving image content is provided through streaming technology by server station 9 in the very similar manner to that in the conventional live television broadcast program provided by television station 5. In more detail, if the URL for live streaming is selected on time of "broadcast program schedule table", the live digital moving image content will be enjoyed from its beginning In contrast to that, if the URL for live streaming is selected in midstream of the slot of "broadcast program schedule table", the live digital moving image content will be enjoyed from the midstream of the content corresponding to the time when the URL is selected. The live digital moving image content above is kept in server station 9 until the expiration date given in step S186. Accordingly, if the live digital moving image content is unfortunately missed on time, it is generally possible to enjoy the content afterward. For example, if such live digital moving image content is to be rerun in accordance with "broadcast program schedule table", the content can be enjoyed by means of the function of steps S178 and S180 in the same manner as that of general streaming program. In case of no plan of rerun in accordance with "broadcast program schedule table", it is still possible to enjoy the missed content until its expiration date by mean of "archive function" explained later.

In step S188, it is checked whether or not any streaming digital moving image content has been provided acting on in accordance with the "broadcast program schedule table". If any, the flow goes to step S190 to provide the content with a specific URL indicative of "archive" digital moving image content, the flow then going to step S192. On the other hand, if it is not confirmed in step S188 that any streaming digital moving image content has been provided acting on in accordance with the "broadcast program schedule table", the flow directly goes to step S192. The digital moving image content provided with the "archive" URL corresponds to a digital moving image content which is not planned to be provided acting on "broadcast program schedule table", but is merely kept for provision on demand when the content is designated with the "archive" URL in accordance with a selection or search into the archive list. The digital moving image content with the "archive" URL can also be provided when the "archive" URL is designated through any of the functions in FIG. 4 to FIG. 6.

In step S192, it is checked whether or not the expiration date for any digital moving image content is reached. If any, the flow goes to step S194 to delete the digital moving image content from the archive of server station 9. Further, in step S196, the URL given to the deleted content is also cancelled, the flow then going to step S198. On the other hand, if it is not confirmed in step S192 that the expiration date for any digital moving image content is reached, the flow directly goes to step S198.

In step S198, it is checked whether or not a regular maintenance date for server station 9 has come to go to the end if it is the case. On the other hand, if it is not confirmed in step S198 that the regular maintenance date for server station 9 has come, the flow goes back to step S172 to repeat steps S172 to S198 unless the maintenance date is detected in step S198. The repetition of steps S172 to S198 achieves control of various digital moving image contents in data base 32 of server station 9 in reacting on various changes caused during the repetitions.

In the above description, the "regular program URL" for digital moving image content provided by servers station 9 is broadly considered as a "channel" of a broadcast station such as television station 5. In other words, the provision of digital moving image content by server station 9 through streaming technology is achieved in the very similar manner to that in the conventional television program provided by television station 5. In the same sense, television station 5 can be broadly considered as a "provider" of digital moving image contents in such a case that the "regular program URL" for digital moving image content provided by server station 9 is broadly considered as a "channel" for television station 5.

Various features of this invention are not only applicable to the above embodiment, but also widely to other embodiments. For example, the feature of control of the expiration date of the contents and the automatic download of the contents data explained in FIG. 5 through FIG. 8 are not applicable to the case of digital moving image contents data, but also widely to other contents data such as still image contents data or text data. In more detail in the case of obtaining content data through internet, download of the content data itself may not be actually carried out provided that the expiration date of the content data on the server is securely confirmed. Instead in this case, information such as "book mark" necessary for accessing again the content data is merely recorded so that actual download is to be automatically carried out when the expiration date comes close or becomes unclear. According to this application, redundant download of content data can be saved or avoided and at the same time such inexpediency is overcome that "book marked" content data has been deleted when the data is accessed again for actual download or review.

What is claimed is:

1. A receiving apparatus configured to receive digital moving image contents from outside providers of the digital moving image contents, the outside providers including a first provider providing a digital moving image content in accordance with a program schedule table predetermined by the provider and a second provider providing the digital moving image content independently form the program schedule table, the receiving apparatus comprising:
a remote controller that manually selects one of the digital moving image contents provided from the first provider, the selected digital moving image content being an integral program continuing from an opening part to an ending part by way of a midstream part;
a tuner that receives the selected digital moving image content at the midstream part of the integral program which is provided by the first provider at the time of selection by the remote controller;
an I/O interface that receives from the second provider the digital moving image content including entire data of the digital moving image content from the opening part to the ending part of the integral program same as the integral program received from the first provider, the I/O interface locating the integral program in accordance with information from the tuner at the time of selection by the remote controller;
a television display that shows the digital moving image contents from the first provider and the second provider; and
a memory in a TV set computer that stores the entire data of the digital moving image content received by the I/O interface.

2. The receiving apparatus according to claim 1 further comprising a TV set processor that has the television display show a past part of the integral program which has been already provided by the first provider and retrieved from the memory in the TV set computer.

3. The receiving apparatus according to claim 2, wherein the past part is the opening part of the integral program.

4. The receiving apparatus according to claim 1 further comprising a control signal receiver that designates a desired part of the same integral program received by the I/O interface.

5. The receiving apparatus according to claim 1, wherein the memory in the TV set computer keeps information necessary for the TV set computer to locate the integral program same as the integral program received from the first provider.

6. A receiving apparatus configured to receive digital moving image contents from outside provider system of the digital moving image contents, the outside provider system being capable of providing a digital moving image content in accordance with a program schedule table predetermined by the provider and providing the digital moving image content independently form the program schedule table, the receiving apparatus comprising:
a remote controller that manually selects one of the digital moving image contents provided in accordance with a program schedule table, the selected digital moving image content being an integral program continuing from an opening part to an ending part by way of a midstream part;
a tuner that receives the selected digital moving image content at the midstream part of the integral program at the time of selection by the remote controller;
I/O interface that receives the digital moving image content provided independently form the program schedule table including entire data of the digital moving image content from the opening part to the ending part of the integral program same as the integral program provided in accordance with a program schedule table, the I/O interface locating the integral program in accordance with information at the time of selection by the remote controller;
a television display that shows the digital moving image contents provided in accordance with a program schedule table and the digital moving image content provided independently form the program schedule table; and
a memory in a TV set computer that stores the entire data of the digital moving image content received by the I/O interface.

7. The receiving apparatus according to claim 6 further comprising a TV set processor that has the television display show a past part of the integral program which has been already provided in accordance with a program schedule table and retrieved from the memory in the TV set computer.

8. The receiving apparatus according to claim 7, wherein the past part is the opening part of the integral program.

9. The receiving apparatus according to claim 6 further comprising a control signal receiver that designates a desired part of the same integral program received by the I/O interface.

10. The receiving apparatus according to claim 6 wherein the memory in the TV set computer keeps information necessary for the TV set computer to locate the integral program same as the integral program provided in accordance with a program schedule table.

11. The receiving apparatus according to claim 1, wherein the first provider includes selectable sub providers, wherein the s remote controller selects the one of the digital moving image contents by means of selecting the sub provider, and wherein the one of the digital moving image contents is provided by the selected sub provider.

12. The receiving apparatus according to claim 1, wherein the digital moving image contents is provided by the first provider by streaming technology in accordance with the program schedule table.

13. The receiving apparatus according to claim 4, wherein the control signal receiver designates an optional part of the digital moving image contents in response to a manual operation.

* * * * *

Disclaimer

10,880,592 B2 - Masahide Tanaka, Osaka (JP). DIGITAL CONTENTS RECEIVING APPARATUS. Patent dated December 19, 2020. Disclaimer filed February 27, 2025, by the assignee, NL Giken Incorporated.

I hereby disclaim the following complete Claims 6-13 of said patent.

*(Official Gazette, April 8, 2025)*